United States Patent
Pauley

(10) Patent No.: US 9,197,527 B2
(45) Date of Patent: *Nov. 24, 2015

(54) NETWORK APPLIANCE FOR MONITORING NETWORK REQUESTS FOR MULTIMEDIA CONTENT

(71) Applicant: Justin Pauley, New York, NY (US)

(72) Inventor: Justin Pauley, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/470,188

(22) Filed: Aug. 27, 2014

(65) Prior Publication Data

US 2014/0365652 A1 Dec. 11, 2014

Related U.S. Application Data

(63) Continuation of application No. 13/409,337, filed on Mar. 1, 2012, now Pat. No. 8,832,264.

(51) Int. Cl.
*H04L 29/06* (2006.01)
*H04L 12/26* (2006.01)
(Continued)

(52) U.S. Cl.
CPC ........ *H04L 43/0876* (2013.01); *H04L 12/4625* (2013.01); *H04L 12/4633* (2013.01); *H04L 43/028* (2013.01); *H04L 63/306* (2013.01); *H04L 67/10* (2013.01)

(58) Field of Classification Search
CPC ... H04L 29/08072; H04L 29/06; H04L 43/00; H04L 43/0876
USPC .................................................. 709/223–226
See application file for complete search history.

(56) References Cited

U.S. PATENT DOCUMENTS 5,835,722 A   11/1998  Bradshaw et al.
6,233,618 B1 * 5/2001  Shannon ........... G06F 17/30887
                                                 707/999.01

(Continued)

FOREIGN PATENT DOCUMENTS

WO    WO 2011/035443    3/2011

OTHER PUBLICATIONS

How-To Geek, How to Configure Your Router for Network Wide URL Logging, downloaded from http://www.howtogeek.com/68886/how-to-configure-your-router-for-network-wide-url-logging/ on Feb. 20, 2012.

(Continued)

*Primary Examiner* — Farid Homayounmehr
*Assistant Examiner* — Lizbeth Torres-Diaz
(74) *Attorney, Agent, or Firm* — Gordon & Jacobson, P.C.

(57) ABSTRACT

A network appliance that monitors multimedia content requested by at least one networked computer coupled to a local area network and the Internet. The appliance includes a database, at least one interface processing packetized data encapsulating TCP/IP packet data generated by the network computer(s) and communicated over the local area network, routing logic for the TCP/IP packet data, and processing means processing the TCP/IP packet data to identify whether it specifies a URL representing at least one particular file type of multimedia content, and if so, adds the specified URL and an associated date and time to the database. It can include a first mechanism monitoring physical connections/disconnections to the local area network over time, and a second mechanism monitoring Internet connectivity over time. It can also provide access to information stored in the database and/or provide upload of stored information to a remote system for remote access to such information.

20 Claims, 8 Drawing Sheets

(51) Int. Cl.
*H04L 12/46* (2006.01)
*H04L 29/08* (2006.01)

(56) References Cited

U.S. PATENT DOCUMENTS

| | | |
|---|---|---|
| 6,510,458 B1 | 1/2003 | Berstis et al. |
| 2003/0182420 A1 | 9/2003 | Jones et al. |
| 2004/0133631 A1* | 7/2004 | Hagen ............... G60F 17/30873 709/203 |
| 2008/0201380 A1 | 8/2008 | Reasor et al. |
| 2011/0065419 A1* | 3/2011 | Book .................... G06F 21/305 455/411 |
| 2011/0161005 A1 | 6/2011 | Hajianpour et al. |
| 2011/0214144 A1 | 9/2011 | Girouard |
| 2011/0292938 A1* | 12/2011 | Harp ................ G06F 17/30867 370/392 |
| 2013/0054693 A1 | 2/2013 | Chennamadhavuni |
| 2013/0262575 A1 | 10/2013 | Xiong et al. |

OTHER PUBLICATIONS

PixAlert, Enterprise Content Audit Solutions, Product Outline, 2011.

* cited by examiner

NETWORK APPLIANCE FOR MONITORING NETWORK REQUESTS FOR MULTIMEDIA CONTENT

BACKGROUND

The present invention relates broadly to the devices for monitoring packet data communicated over a packet data network. More particularly, this invention relates to devices for monitoring requests for content encapsulated by such packet data for oversight of Internet activity.

The Internet has become an important part of our everyday life. More specifically, web sites, e-mail, instant messaging and social networks are technologies that rely on the Internet to provide mechanisms widely used for personal, educational, and business communication. In addition, Internet-based e-commerce has become an important part of the retail chain and the supply chain of many modern businesses. The open and dynamic nature of the Internet also enables access to digital material that is deemed objectionable by parents, school administrators and/or employers. Deeming material as objectionable is subjective in nature and often involves nudity, explicit sexual acts (e.g., pornography), profanity, content not suitable for children (e.g., drugs, alcohol, tobacco, weapons, gambling, etc.) and/or content not suitable for the workplace.

Parents, schools and businesses often employ content monitoring and filtering technology that automatically identifies and filters (i.e., blocks) web page access to objectionable material based on content classification techniques. Such content classification techniques are typically performed on Domain Name System (DNS) requests and involve contextual word analysis, flesh tone analysis, maintenance of a database of categorized web sites, or a combination of all three.

The contextual word analysis and the flesh tone analysis often return false positives and thus over-block. The maintenance of a database of categorized web sites is a powerful approach; however, maintaining and a comprehensive and accurate list of categorized web sites is a difficult task due to the dynamic nature of the Internet. Thus, it can lead to false negatives and therefore allow for access to objectionable content.

Moreover, much of the commercially-available content monitoring and filtering technology is software-based and is installed on each and every monitored device. This solution is expensive and difficult to develop (as the software must be developed for the large number of processing platforms of the monitored devices). It is also difficult to maintain (particularly, for a large number of monitored devices) and can be bypassed by users with relative ease in many circumstances.

SUMMARY OF THE INVENTION

The present application includes a network appliance that monitors content requested by at least one networked computer operably coupled to a local area network and the Internet. The network appliance includes a database stored on the network appliance. At least one interface receives and processes packetized data, whereby the packetized data includes packetized data that encapsulates Transmission Control Protocol/Internet Protocol (TCP/IP) packet data generated by the at least one networked computer and communicated over the local area network. Routing logic forwards the TCP/IP packet data as part of packetized data for downstream data communication to the Internet. Processing means processes the TCP/IP packet data to identify whether it specifies a universal resource locator (URL) representing at least one particular file type of multimedia content, and if so, adds the specified URL and an associated date and time to the database.

The network appliance also preferably includes a first mechanism that monitors physical network connectivity of the network appliance over time to identify interruptions in such network connectivity, and that stores data representing identified interruptions in physical network connectivity in the database.

The network appliance also preferably includes a second mechanism that monitors Internet connectivity of the network appliance over time to identify interruptions in such Internet connectivity, and that stores data representing identified interruptions in Internet connectivity in the database.

The network appliance can include access means for providing access to information stored in the database to at least one authorized user in order to allow the at least one authorized user to review the multimedia content corresponding to URLs specified by TCP/IP data communicated over the local area network as well as review the status of the physical network connections and Internet connectivity of the device over time. The network appliance can also include means for uploading information stored in the database to a remote computer system. The remote computer system provides access to information stored in the database to at least one authorized user in order to allow the at least one authorized user to review the multimedia content corresponding to URLs specified by TCP/IP data communicated over the local area network as well as review the status of the physical network connections and Internet connectivity of the device over time.

The network appliance can be deployed to dynamically compile and store information in the database locally (and possibly in the remote computer system) for certain multimedia content types that are requested by all of the networked devices connected to a local area network (LAN), or by single computer connected to a LAN. It also detects its own physical disconnections and connections to the network and status of connectively of the Internet over time and stores such results in the database. It also can store configuration settings for operation of the network appliance in the database.

The information collected by the monitoring device and stored in the database locally (and/or possibly in a remote computer system) can be accessed by authorized users and allows for effective monitoring of the multimedia content that is being requested from the Internet together with logging that ensures that unauthorized users are not disconnecting the network appliance from the network and thwarting the monitoring function of the network appliance.

DETAILED DESCRIPTION OF THE PREFERRED EMBODIMENTS

Figure 1:
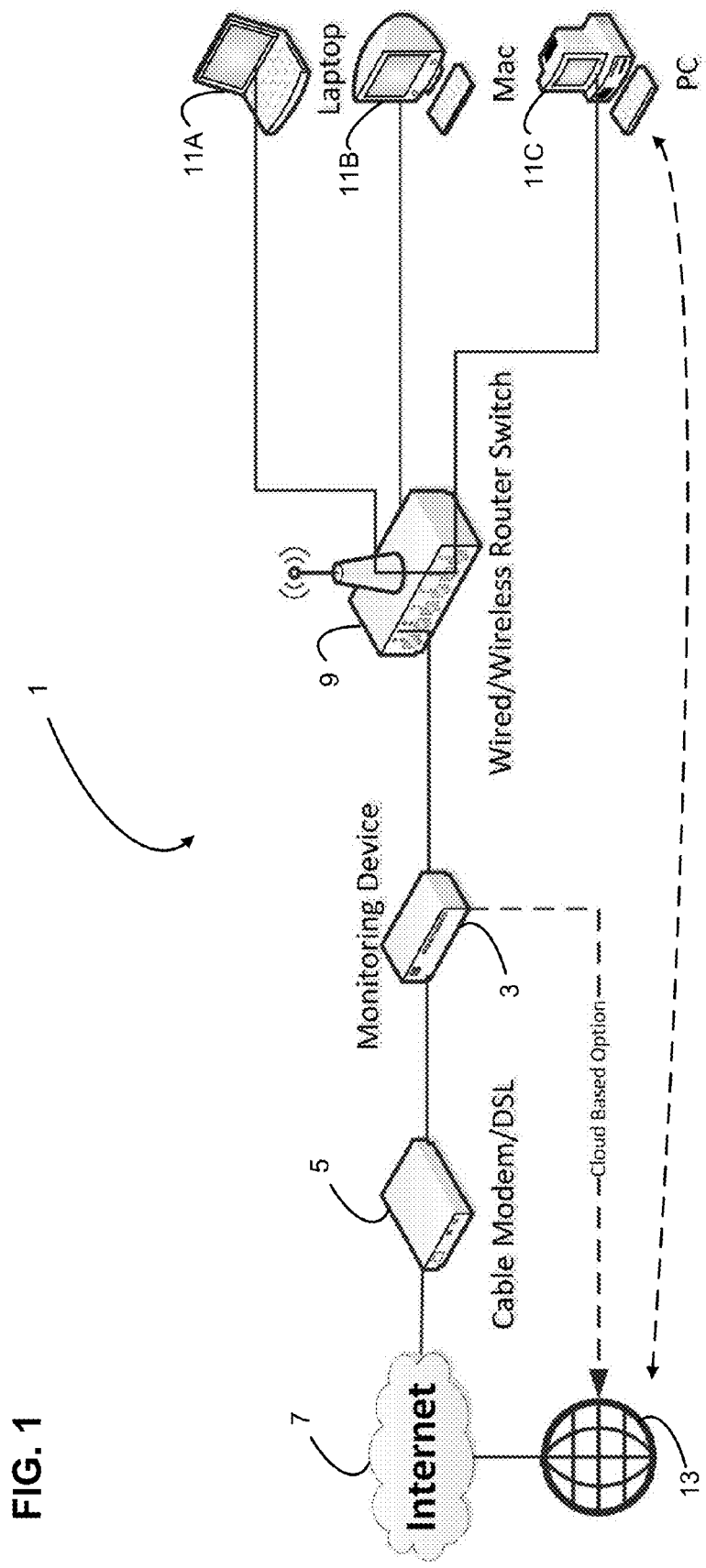
FIG. 1 is a system diagram of a network that includes a network monitoring appliance according to the present application.

FIG. 1 is a schematic view of a data communication network 1 that includes a monitoring device 3 that monitors and logs requests for multimedia content encapsulated by packet data communicated over the data communication network 1 for oversight of Internet activity. The data communication network 1 includes a broadband modem 5 (such as a cable modem or Digital Subscriber Line (DSL) modem) that is operably coupled to the Internet 7. The broadband modem 5 provides bi-directional data communication over the Internet 7 for broadband Internet access. The data communication network 1 also includes a gateway router 9 that is connected by wired or wireless network links (such as wired 802.3 Ethernet links or wireless 802.11 Ethernet links) to a number of local networked devices such as a laptop computer 11A, Mac computer 11B, and personal computer 11C. The monitoring device 3 is a communication node connected between the gateway router 9 and the broadband modem 5.

The gateway router 9 can include a data packet switching function (i.e., Ethernet switching function) that allows for wired connections to local networked devices as part of a local area network as is well known. It can also include a wireless LAN interface (i.e., IEEE 802.11x interface) that allows for wireless connections to local networked devices as part of a local area network as is well known. The local networked devices (11A, 11B, 11C) are assigned with IP addresses that are part of a subnet for the local area network. For Internet access, the gateway router 9 performs a routing function that forwards data packets between the networked devices (11A, 11B, 11C) of the local area network and the Internet 7 via the monitoring device 3 and the broadband modem 5. Based on internal routing tables, the gateway router 9 reads the destination IP address for each incoming data packet. If the destination IP address is outside the subnet of the local area network, the gateway router 9 forwards it to the Internet 7 via the monitoring device 3 and the broadband modem 5.

The monitoring device 3 is assigned a LAN (or Private) IP address that falls within its own subnet. The LAN (or Private) IP address of the monitoring device 3 is typically static in nature and fixed by user. The monitoring device 3 is also assigned a WAN (or Public) IP address that is outside its own subnet. The WAN (or Public) IP address of the monitoring device 3 can be static in nature and fixed by configuration; it can also be dynamic in nature and set by common network protocols (such as through Dynamic Host Configuration Protocol (DHCP) services or Point-to-Point Protocol over Ethernet (PPPoE) services supported by the ISP access network that connects to the broadband modem 5). The LAN (or Private) IP address of the monitoring device 3 can be used by the gateway router 9 as well as the local networked devices (11A, 11B, 11C) of the local area network as the destination address for communicating data packets to the monitoring device 3. The WAN (or Public) IP address of the monitoring device 3 can be used to provide for communication between the monitoring device 3 and Internet-based by host systems (or other remote computer systems) for communicating data packets therebetween.

The gateway router 9 is assigned a LAN IP address (also commonly referred to as a Private IP address) that falls within the subnet of the local area network. The gateway router 9 is also assigned a wide area network (WAN) IP address (also commonly referred to as a Public IP address) that falls within the subnet of the monitoring device 3. The LAN (or Private) IP address of the gateway router 9 can be used by the local networked devices of the local area network as the destination address for communicating data packets to the gateway router 9. The WAN (or Public) IP address of the gateway router 9 is used by monitoring device 3 as the destination address for communicating data packets to the gateway router 9.

The routing function of the router 9 can employ a process of network address translation (NAT), which operates to modify IP address information in IP packet headers while in transit across the router 9. The NAT process is used to hide the Private IP addresses of the local area network behind a single Public IP address (or in some cases a small group of Public IP addresses). To avoid ambiguity in the handling of returned packets, the NAT process alters higher level information such as TCP/UDP ports in the outgoing communications and maintains a translation table so that return packets can be correctly translated back.

The data packets communicated from the monitoring device 3 to the gateway router 9 include incoming data packets from the Internet that are destined to the gateway router 9 as a result of NAT. These data packets will be translated for return to the appropriate networked device on the local area network by the routing function of the gateway router 9. The WAN (or Public) IP of the gateway router 9 can be static in nature and fixed by configuration; it can also be dynamic in nature and set by a common network protocol (such as through DHCP services supported by the monitoring device 3).

The gateway router 9 typically provides for other useful network services, such as DNS proxy server services, firewall services, packet routing with network address translation, port forwarding services, DHCP services for dynamically assigning IP addresses to the networked devices of the local area network, and a web server for configuration of the network services that it is equipped with. The gateway router 9 can also provide for other useful network services, such as virtual private network (VPN) services (e.g., for establishing Secure Socket Layer (SSL) VPN connections and/or Internet Protocol Security (IPsec) VPN connections with the local area network, VPN pass-through functionality, Dynamic DNS services, content filtering of DNS requests, blocking certain types of network traffic (such as email, chat, web browsing) for certain time periods and/or certain computers), and other parental/business control services.

Figure 2A:
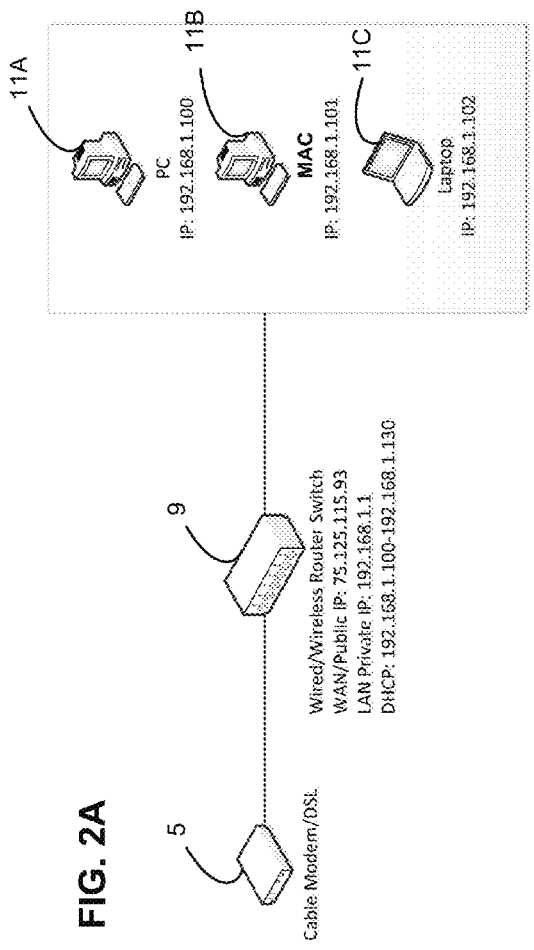
FIG. 2A is a system diagram illustrating assignments of Internet Protocol (IP) addresses to the nodes of a conventional home network that does not include the network monitoring appliance of FIG. 1.

FIG. 2A shows an exemplary configuration of IP addresses of the gateway router 9 and the local area networked devices (11A, 11B, 11C) with the monitoring device 3 removed from the network. In the configuration of FIG. 2A, the gateway router 9 is assigned a LAN (or Private) IP address of 192.168.1.1 on the subnet 192.168.1.x, and the networked devices 11A, 11B, 11C are assigned IP addresses that are also on this subnet by DHCP server functions of the router 9 (which is set to allocate IP addresses in the range from 192.168.1.100 to 192.168.1.130). The gateway router 9 is also assigned a WAN (or Public) IP address of 75.125.115.93.

Figure 2B:
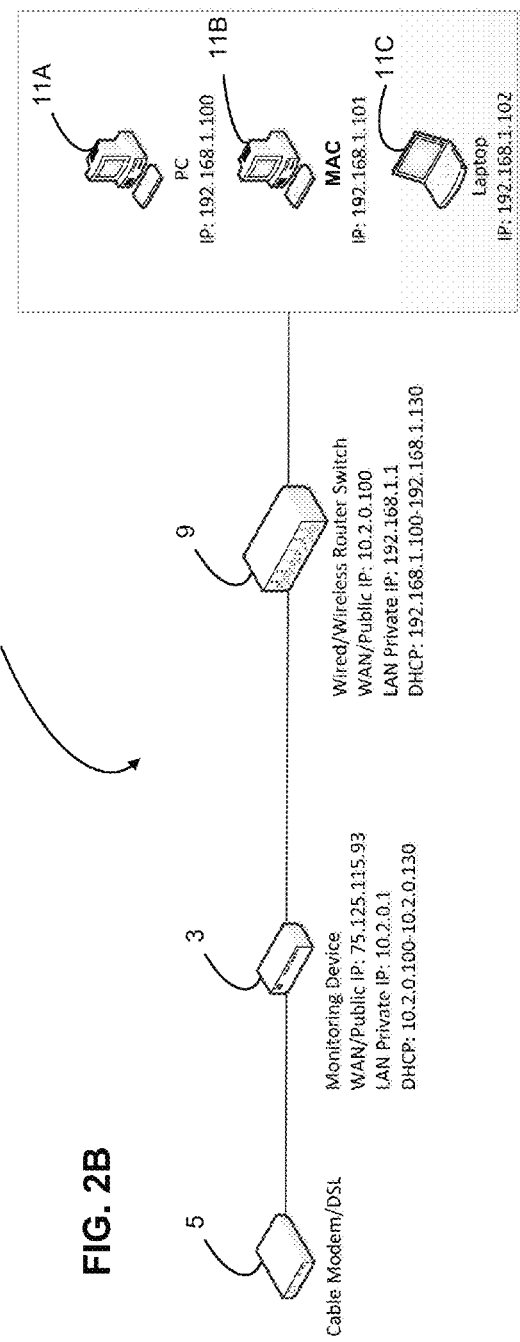
FIG. 2B is a system diagram illustrating assignments of IP addresses to the nodes of the network of FIG. 1.

FIG. 2B shows an exemplary configuration of IP addresses of the monitoring device 3, the gateway router 9, and the local area networked devices (11A, 11B, 11C) where the monitoring device 3 is part of the network 1 and connected between the gateway router 9 and the broadband modem 5. In the configuration of FIG. 2B, the monitoring device 3 is assigned a LAN (or Private) IP address of 10.2.0.1 on its own subnet 10.2.0.x. The monitoring device 3 is also assigned a WAN (or Public) IP address of 75.125.115.93. The gateway router 9 is assigned a LAN (or Private) IP address of 192.168.1.1 on the subnet 192.168.1.x, and the networked devices 11A, 11B, 11C are assigned IP addresses that are also on this subnet by DHCP functions of the router 9 (which is set to allocate IP addresses in the range from 192.168.1.100 to 192.168.1.130). The gateway router 9 is also assigned a WAN (or Public) IP address of 10.2.0.100 on the subnet of the monitoring device 3 by DHCP functions of the monitoring device 3 (which is set to allocate IP addresses in the range from 10.2.0.100 to 10.2.0.130).

Figure 3:
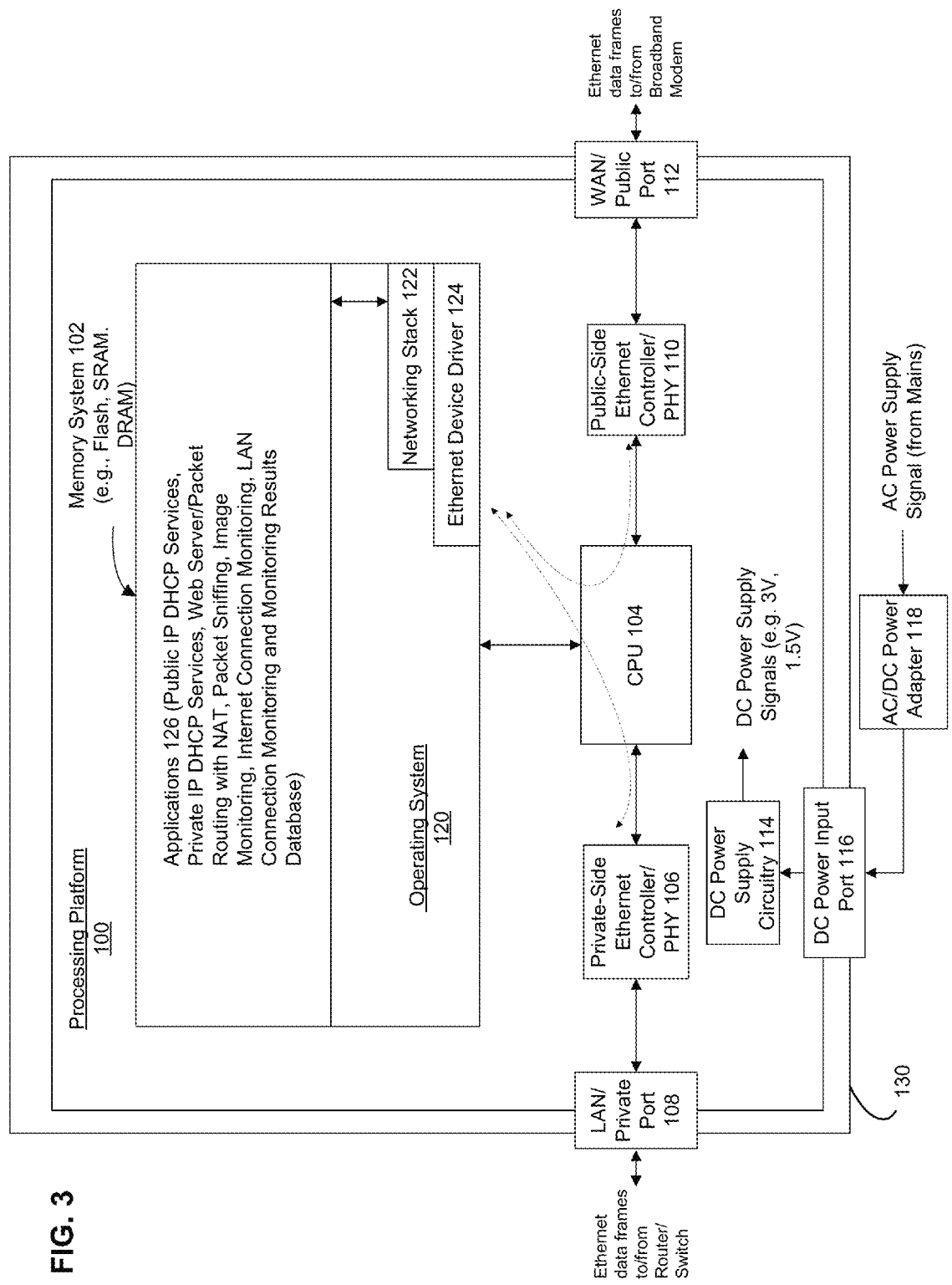
FIG. 3 is a schematic diagram of exemplary system architecture of the network monitoring appliance of FIG. 1.

FIG. 3 is a functional block diagram illustrating an exemplary system architecture of the monitoring device 3 of FIG. 1, which includes a processing platform 100 that includes a microprocessor 104 and associated memory system 102. The memory system 102 is typically realized by one or more non-volatile memory modules (such as flash memory) and one or more volatile memory modules (such as SRAM and/or DRAM memory modules). A first Ethernet controller and PHY interface 106 (labeled Private-Side Ethernet Controller and PHY) interfaces to the microprocessor 104 over a suitable interface (such as a high speed serial interface, e.g., PCI Express). The PHY circuitry of the interface 106 connects the Ethernet controller (often called a MAC) to a physical medium such as a CAT-5 networking cable. The PHY circuitry typically includes PCS (Physical Coding Sublayer) circuitry, PMA (Physical Medium Attachment) sublayer circuitry, and PMA (Physical Medium Attachment) sublayer circuitry. The PCS circuitry performs auto-negotiation and coding, the PMA sublayer circuitry performs framing, octet synchronization/detection, and scrambling/descrambling. The PMD sublayer circuitry consists of a transceiver for the physical medium. The PHY circuitry of the interface 106 is electrically connected to a first port 108 (labeled LAN/Private port), which is adapted to receive a suitable connector (such as an RJ-45 connector) that terminates to a physical medium (e.g., a CAT-5 networking cable) whose opposite end is connected to the WAN (Public) port of the gateway router 9. This physical medium carries Ethernet data frames (such as 802.3 Ethernet data frames) between the LAN/Private port 108 and the WAN (Public) port of the gateway router 9 to provide for bidirectional packet data communication between these two nodes. A second Ethernet controller and PHY interface 110 (labeled Public-side Ethernet controller and PHY) interfaces to the microprocessor 104 over a suitable interface (such as a high speed serial interface, e.g., PCI Express). The PHY circuitry of the interface 110 is electrically connected to a second port 112 (labeled WAN/Public port), which is adapted to receive a suitable connector (such as an RJ-45 connector) that terminates a physical medium (such as a CAT-5 networking cable) whose opposite end is connected to the broadband modem 5. This physical medium carries Ethernet data frames (such as 802.3 Ethernet data frames) between the WAN/Public port 112 and the broadband modem 105 to provide for bidirectional packet data communication between these two nodes.

The processing platform 100 also includes software (including an operating system kernel 120, a networking stack 122, Ethernet device driver 124, and applications 126) that is persistently stored in non-volatile memory of the memory system 102 (e.g., such as in flash memory), and that is loaded into volatile memory of the memory system 102 (such as into SRAM or SRAM modules) for execution by the microprocessor 104.

The monitoring device 3 further includes direct current (DC) power supply circuitry 114 that transforms DC power supply signals supplied by an AC/DC power adapter 118 into DC signals (e.g., 3V and/or 1.5V signals) necessary for operation of the electrical components of the processing platform 100 and other components of the device 3. The AC/DC power adapter 118 is connected to the DC power supply circuitry 116 by an input port 116. The AC/DC power adapter 118 is supplied with AC power supply signals (120 VC 60 Hz AC Signal) by a mains electrical connection. The AC/DC power adapter 118 transforms alternating current (AC) power supply signals supplied by the mains electrical connection to the DC power supply signals input to the DC power supply circuitry 114. The monitoring device 3 can also include a heat sink and/or fan(s) for cooling purposes.

The components of the processing platform 100 (including the memory system 102, microprocessor 104, Private-Side Ethernet Controller and PHY interface 106, Public-Side Ethernet Controller and PHY interface 110, and DC Power Supply Circuitry 114) are supported on one or more printed circuit boards and enclosed within a system enclosure 130. The ports 108, 112 and 116 are accessible from outside the enclosure 130 to allow for suitable connections thereto. A light panel (not shown) can be integrated with the enclosure 130 such that it is viewable from outside the enclosure 130. The light panel is interfaced to the microprocessor 104 to provide visual indications of the operational status of the device 3 as is similar to conventional gateway routers. For example, the light panel can provide visual indications of the connection state and activity between the Private-side Ethernet Controller and PHY interface 106 and the gateway router 9 as well as the as the connection state and activity between the Public-side Ethernet Controller and PHY interface 110 and the broadband modem 5.

The applications 126 stored in the memory system 102 and executed by the microprocessor 104 preferably include the following modules:

Monitoring Results database, which stores configuration data for the Image Monitoring services, Internet Connection Monitoring services, and LAN Connection Monitoring services as well as log data generated by the Image Monitoring services, Internet Connection Monitoring services, and LAN Connection Monitoring services; the configuration data as well as the log data is accessible to one or more authorized users (for example, by user name and password authentication schemes) by the Web Server services;

Public IP DHCP services which function as a DHCP client to configure the WAN/Public IP address of the monitoring device 3;

Private IP DHCP Services which function as a DHCP server to configure the WAN/Public IP address of the devices (e.g., the gateway router 9) connected to its LAN/Private port 108;

Web Server services for processing HTTP requests for web content hosted on the device; such processing can allow for user authentication (for example, by user name and password authentication schemes) and access by authorized users to the Monitoring Results database hosted on the monitoring device 3;

Packet Routing with network address translation (NAT) services, which modify TCP/IP data packets that are destined for the Internet utilizing NAT and forwards such TCP/IP data packet to the networking stack 122 for communication by the Public-side Ethernet controller and PHY interface 110 to the broadband modem 5 for communication to the Internet; in order to avoid ambiguity in the handling of returned TCP/IP data packets, the Packet Routing with NAT services alters higher level information such as TCP/UDP ports in the outgoing communications and maintains a translation table that is accessed to correctly translate back the return TCP/IP packets;

Image Monitoring services, which operate on copies of TCP/IP packet data that are received at the Private-side Ethernet Controller and PHY interface 106 and destined for the Internet; each TCP/IP packet data copy is processed to determine if it matches a predetermined profile corresponding to common methods for accessing multimedia content on the Web; if so, the TCP/IP packet data copy is further processed to determine if it specifies a request for one or more particular types of multimedia files; in the event that the TCP/IP packet data copy specifies a request for one or more particular types of multimedia files, data corresponding to the request (such as the URL of the request as well as the time and date of the request) is logged in the Monitoring Results database hosted on the device 3;

Internet Connection Monitoring services, which monitors connectivity of the device 3 to the Internet over time, and stores results of the Internet connectivity status over time in the Monitoring Results database hosted on the device 3; and LAN Connection Monitoring services, which monitor network cable connection or disconnection from the port 108 or port 110 over time and stores data (such as event type—disconnected or connected—and time of the event) in the Monitoring Results database hosted on the device 3.

The applications 126 of the processing platform 100 of the monitoring device 3 can include additional services, including for packet filtering, content filtering of DNS requests, blocking certain types of network traffic (such as email, chat, web browsing) for certain time periods and/or certain computers), web site logging of web sites accessed by TCP/IP network traffic forwarded by the monitoring device 3, other parental/school/business control services, VPN pass-through functionality, and/or Dynamic DNS services.

The configuration data stored in the Monitoring Results database of the device includes parameters that control operations of the Image Monitoring services, Internet Connection Monitoring services, and LAN Connection Monitoring services. For example, the configuration data can include LAN (Private) settings for the device 3, such as LAN (Private) IP Address and Subnet mask for static IP address assignment, Gateway address for DHCP services (and possibly for DNS services), and one or more DNS server addresses;

WAN (Public) settings for the device 3, such as PPPoE settings (if used), static IP Address and subnet mask for static IP address assignment, DHCP settings for dynamic IP address assignment, one or more DNS server addresses, and MAC Cloning settings;

Monitoring settings for the device 3, such as settings for suspending monitoring for a set duration, for disabling monitoring, for deleting media or connection log history, login information, password settings, settings for enabling/disabling storage of the Monitoring Results database in a remote computer system, settings for saving files and/or links to files, settings for selectively enabling/disabling the monitoring of certain media types to monitor (such as images, videos, music), settings to ignore files under a specific size, settings for automatic log pruning on a schedule, and settings for external servers for testing Internet connectivity.

In an exemplary embodiment, the Internet Connection Monitoring services of the application 126 generates a ping (Internet Control Message Protocol (ICMP) type 8) TCP/IP packet that is destined to a set of one or more reliable external servers, and supplies such packet to the Networking Stack 122. The Networking Stack 122 encapsulates each respective TCP/IP packet into an Ethernet data frame destined for the broadband modem 5 and passes the Ethernet data frame to the Ethernet Device Driver 124, which standardizes the received Ethernet data frame and forwards it on to the Public-side Ethernet Controller and PHY interface 110 (for example, by hardware interrupt processing, memory mapped IO processing or other suitable interface mechanism). The Public-Side Ethernet Controller and PHY interface 110 transmits the Ethernet data frame to the broadband modem 5 via the WAN/Public port 112 for communication to the external server over the Internet. After supplying a respective ping (ICMP type 8) packet to the Networking Stack 122, the Internet Connection Monitoring services of the application 126 waits for receipt of an ICMP response packet communicated from the external server and tracks the round trip delay between the ICMP packet and the ICMP response packet. Specifically, the external server replies with an ICMP response packet destined for the WAN/Public address of the device 3, which is communicated over the Internet and received as part of an Ethernet data frame on the Public-side Ethernet Controller and PHY interface 110 via the WAN/Public 112. The received Ethernet data frame is forwarded to the Ethernet Device Driver 124 executing on the CPU 104 (for example, by hardware interrupt processing, memory mapped IO processing or other suitable interface mechanism). The Ethernet Device Driver 124 executing on the CPU 104 standardizes the received Ethernet data frame and passes it to the Networking Stack 122 executing on the CPU 104 via a suitable interface. The Networking Stack 122 extracts the ICMP response packet encapsulated in the Ethernet data frame, and processes the packet data to identify the transport protocol specified by the packet data, forwards the packet data (or parts thereof) to applications 126 that are listening for packets that utilize the identified transport protocol. The Internet Connection Monitoring service of applications 126 is configured to listen to all packets that employ the ICMP transport protocol and thus receives the ICMP response packet data (or parts thereof) as extracted by the Networking Stack 122. The Internet Connection Monitoring services of the applications 126 processes the ICMP response packet to derive the round trip delay between the ICMP packet and the ICMP response packet (or times out after a certain time period with no response from the external server) and stores data (such as time of the ping request, success yes/no, round trip delay) for the Ping request in the Monitoring Results database. This process can be repeated for a number of ping requests (typically four ping requests). The Internet Connection Monitoring service of applications 126 can derive statistics for the number of ping requests, such as minimum, maximum and average round trip delay we well as percentage of packet loss as is conventional. These statistics can also be stored in the Monitoring Results database. In order to provide resiliency in the event that the external servers become unavailable, the process can also be repeated for a number of external servers (for example, over an ordered list of external servers in the event that there is failure for one or more external servers in the list).

In an exemplary embodiment, the LAN Connection Monitoring services of the application 126 cooperates with the operating system kernel to create and store a record for each physical network cable connection or disconnection from the port 108 or port 110 in the Monitoring Results database hosted on the device 3. The operating system kernel can employ a daemon (such as the netplugd daemon or other code together with udev rules that monitors system files in /sys/class/net in Unix systems) to identify network cable connection and disconnection events and communicate such events to the LAN Connection Monitoring services. Other suitable mechanisms for detecting and monitoring physical connection and disconnection of network cables from port 108 and port 110 can also be used.

Figure 4:
FIG. 4 is a block diagram showing exemplary data packet processing operations of the network monitoring appliance of FIG. 1 for Ethernet data frames communicated from the gateway router of FIG. 1.

FIG. 4 is a block diagram showing exemplary data packet processing operations of the monitoring device 3 for Ethernet data frames communicated from the gateway router 9. Such Ethernet data frames are received on the Private-side Ethernet Controller and PHY interface 106 via the LAN/Private port 108, and forwarded onto the Ethernet Device Driver 124 executing on the CPU 104 (for example, by hardware interrupt processing, memory mapped IO processing or other suitable interface mechanism). The Ethernet Device Driver 124 executing on the CPU 104 standardizes the received Ethernet data frame and passes it to the Networking Stack 122 executing on the CPU 104 via a suitable interface. The Networking Stack 122 extracts TCP/IP packet data encapsulated in the Ethernet data frame, processes the TCP/IP packet data to identify the socket (the transport protocol and the port number) specified by the TCP/IP packet data, forwards the TCP/IP packet data (or parts thereof) to applications 126 that are listening to the identified socket.

The Packet Routing with NAT services of applications 126 is configured to listen to all sockets and thus receives the TCP/IP packet data (or parts thereof) as extracted by the Networking Stack 122. In the event that the TCP/IP packet data is destined for the Internet, it processes the TCP/IP packet data utilizing NAT and forwards such TCP/IP data packet to the Networking Stack 122. The Networking Stack 122 encapsulates the TCP/IP data packet into an Ethernet data frame destined for the broadband modem 5 and passes the Ethernet data frame to the Ethernet Device Driver 124, which standardizes the received Ethernet data frame and forwards it on to the Public-side Ethernet Controller and PHY interface 110 (for example, by hardware interrupt processing, memory mapped IO processing or other suitable interface mechanism). The Public-Side Ethernet Controller and PHY interface 110 transmits the Ethernet data frame to the broadband modem 5 via the WAN/Public port 112 for communication to the remote system over the Internet.

The Image Monitoring services of applications 126 is configured to listen to all sockets and thus receives a copy of the TCP/IP packet data (or parts thereof) as extracted by the Networking Stack 122. This functionality can be realized by the libpcap library or analogous modules readily available as open source software for a number of processing platforms. The Image Monitoring services processes the TCP/IP packet data copy to determine if it matches a predetermined profile corresponding to common methods for accessing multimedia content on the Web. For example, the predetermined profile can identify all TCP/IP packet data that specifies a URL and that employs the TCP transport protocol on common web ports (such as port 80, 8081 and 3128). This functionality can be realized by the libnids library or analogous modules readily available as open source software for a number of processing platforms. In the event that the TCP/IP packet data copy matches the predetermined profile corresponding to common methods for accessing multimedia content on the Web, the TCP/IP packet data copy (or portions thereof) is added to a first-in-first-out (FIFO) queue of request objects where each request object includes the TCP/IP packet data copy (or portions thereof), a timestamp (date and time) for the request, and the URL for the request. The objects of the request queue are processed in a FIFO manner to determine if the URL for the request specifies one or more particular types of multimedia files. Such particular multimedia file types can include common image file types (such as .jpeg, .jpg, .gif, .tiff, .tif, .pic, .bmp, .png, etc.), common video file types (such as .avi, .mpg, .mpg4, .swf, .flv, etc.), common audio files (.mp3, .wav, .aif, etc.) and streaming media file types (such as .asf, .wma, .wmv, .flv, etc.). In the event that the URL of the request object specifies one or more of the particular types of multimedia files, data corresponding to the request (such as the URL of the request as well as the timestamp (date and time) of the request) is logged in the Monitoring Results database hosted on the device 3.

For example, the TCP/IP packet data can specify a particular URL "http://www.google.com/intl/en_com/imagers/srpr/logo3w.png" In this example, the Image Monitoring services processes the TCP/IP packet data to determine that it matches the profile corresponding to common methods for accessing multimedia content on the Web (for example, because it employs the TCP transport protocol on common web ports, such as port 80, 8081 and 3128), and adds the TCP/IP packet data (or portions thereof) to the FIFO queue of request objects where each request object includes the TCP/IP packet data (or portions thereof), a timestamp (date and time) for the request, and the URL for the request. The objects of the request queue are processed in a FIFO manner to determine if the URL for the request specifies one or more particular types of multimedia files. In this case, the .png file type of the URL specifies a common image file type, which results in data corresponding to the request (such as the URL of the request as well as the timestamp (date and time) of the request) being logged in the Monitoring Results database hosted on the device 3.

In the event that the URL of the request object specifies one or more of the particular types of multimedia files, it is also contemplated that the Image Monitoring services can issue a request for the URL to the remote system, which is encapsulated as a TCP/IP data packet destined to the remote system which is forwarded to the Networking Stack 122. The Networking Stack 122 encapsulates the TCP/IP data packet into an Ethernet data frame destined for the cable modem 5 and passes the Ethernet data frame to the Ethernet Device Driver 124, which standardizes the received Ethernet data frame and forwards it on to the Public-side Ethernet Controller and PHY interface 110 (for example, by hardware interrupt processing, memory mapped IO processing or other suitable interface mechanism). The Public-Side Ethernet Controller and PHY interface 110 transmits the Ethernet data frame to the cable modem 5 via the WAN/Public port 112 for communication to the remote system over the Internet. The remote system returns the requested content to the networking device 3 over the Internet, where the content is received in one or more Ethernet data frames communicated from the cable modem 5 as described below with respect to FIG. 5. In this case, the Image Monitoring services of applications 126 can possibly process the TCP/IP data copy to extract the requested content, and then store a copy of such content (or possibly a thumbnail of such content) as part of the data logged in the Monitoring Results database hosted on the device 3 for the particular request. In order to accommodate for storage of a large amount of content data in the Monitoring Results database hosted on the device 3, the device 3 can include a mass storage device such as hard disk drive or solid state drive which is used to host the Monitoring Results database on the device 3.

Figure 5:
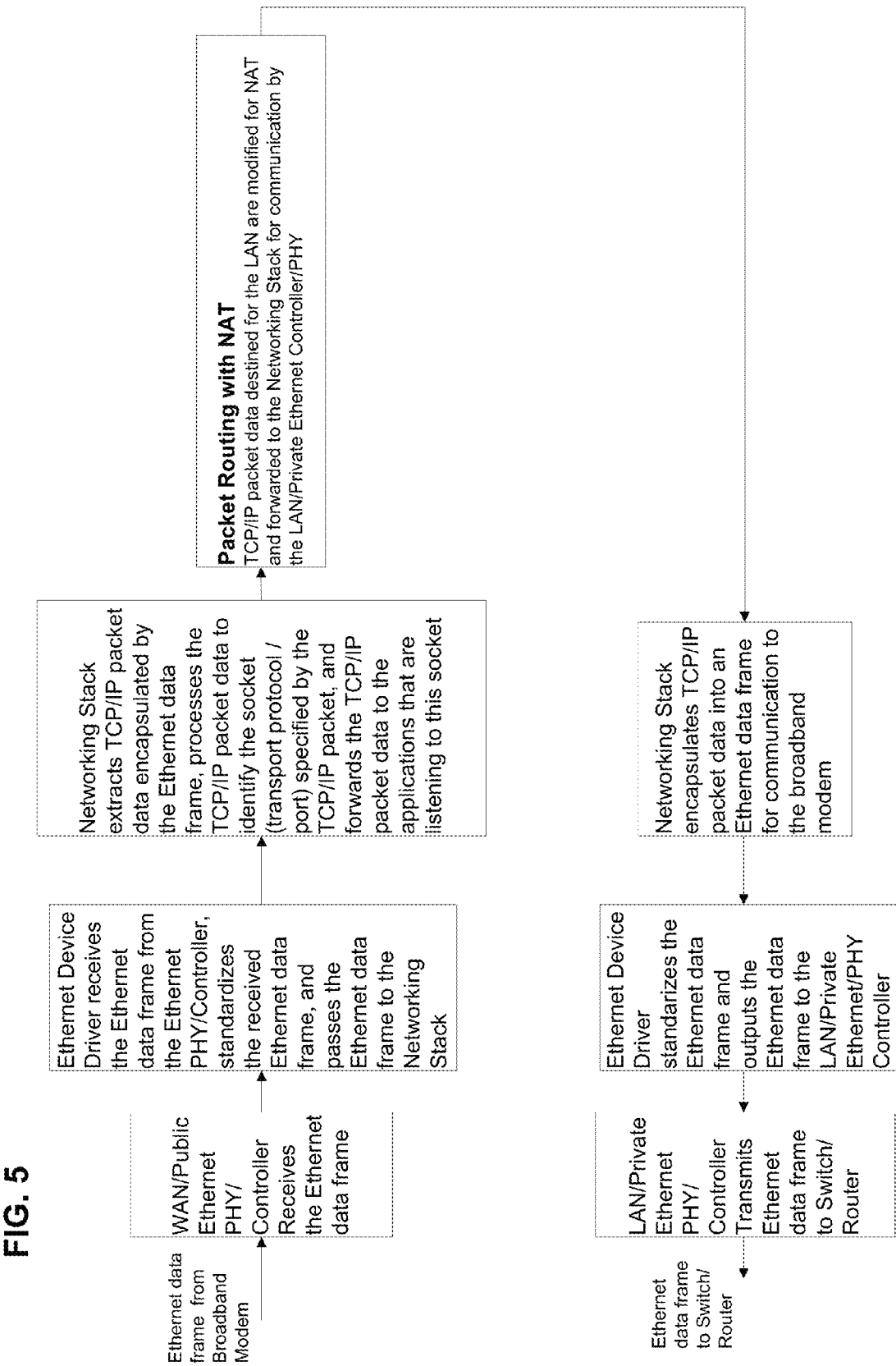
FIG. 5 is a block diagram showing exemplary data packet processing operations of the network monitoring appliance of FIG. 1 for Ethernet data frames communicated from the cable modem of FIG. 1.

FIG. 5 is a block diagram showing exemplary data packet processing operations of the monitoring device 3 for Ethernet data frames communicated from the cable modem 5. Such Ethernet data frames are received on the Public-side Ethernet Controller and PHY interface 110 via the WAN/Public 112, and forwarded onto the Ethernet Device Driver 124 executing on the CPU 104 (for example, by hardware interrupt processing, memory mapped IO processing or other suitable interface mechanism). The Ethernet Device Driver 124 executing on the CPU 104 standardizes the received Ethernet data frame and passes it to the Networking Stack 122 executing on the CPU 104 via a suitable interface. The Networking Stack 122 extracts TCP/IP packet data encapsulated in the Ethernet data frame, processes the TCP/IP packet data to identify the socket (the transport protocol and the port number) specified by the TCP/IP packet data, forwards the TCP/IP packet data (or parts thereof) to applications 126 that are listening to the identified socket.

The Packet Routing with NAT services of applications 126 is configured to listen to all sockets and thus receives the TCP/IP packet data (or parts thereof) as extracted by the Networking Stack 122. In the event that the TCP/IP packet data is destined for the gateway router 9, it processes the TCP/IP packet data utilizing NAT and forwards such TCP/IP data packet to the Networking Stack 122. The Networking Stack 122 encapsulates the TCP/IP data packet into an Ethernet data frame destined for the gateway router 9 and passes the Ethernet data frame to the Ethernet Device Driver 124, which standardizes the received Ethernet data frame and forwards it on to the Private-side Ethernet Controller and PHY interface 106 (for example, by hardware interrupt processing, memory mapped IO processing or other suitable interface mechanism). The Private-Side Ethernet Controller and PHY interface 106 transmits the Ethernet data frame to the gateway router 9 via the LAN/Private port 108.

The applications 126 can also include services that cooperate with a remote server 13 on the internet to upload data stored in the Monitoring Results database to the remote server 13. Such upload operations can be carried out at scheduled intervals (such as every ½ hour). The upload operations can communicate data representing additions to the Monitoring Results database since the last upload operations. The data can be represented by an encrypted xml file or other suitable file format and communicated to the remote server utilizing conventional web services. In this configuration, authorized users (for example, authorized by user name and password authentication) can interact with the remote server 13 over the Internet to access and view the data stored in the Monitoring Results database for that user. Because the monitoring results data is periodically uploaded to the Monitoring Results database hosted on the remote server 13, the storage requirements of the Monitoring Results database hosted on the device 3 can be significantly reduced. For example, the Monitoring Results database hosted on the device 3 can be pruned as free storage space is needed or possibly pruned at predetermined intervals (such as at the end of every other day).

Similar to the Image Monitoring services of applications 126 of the device 3, the remote server 13 can issue requests for the URLs of the requested content, and then stores a copy of such content (or possibly a thumbnail of such content) as part of the data logged in the Monitoring Results database hosted on the remote server 13 for the particular request.

As described above, the Web Server of the application 126 on the device allows an authorized user to access and view the data stored in the Monitoring Results database for the device 3. The authorized user(s) can operate a web-browser on any one of the LAN devices (11A, 11B, 11C) to interact with the Web Server of the application 126 on the device in order to gain access and view the data stored in the Monitoring Results database for the device 3. For the case where the Monitoring Results database is hosted to the remote computer system 13, the authorized user(s) can operate a web-browser on any one of the LAN devices (11A, 11B, 11C) (or possibly on other Internet-connected computer systems outside the LAN) to interact with the remote computer system 13 in order to gain access and view the data stored in the Monitoring Results database for the device 3.

Figure 6:
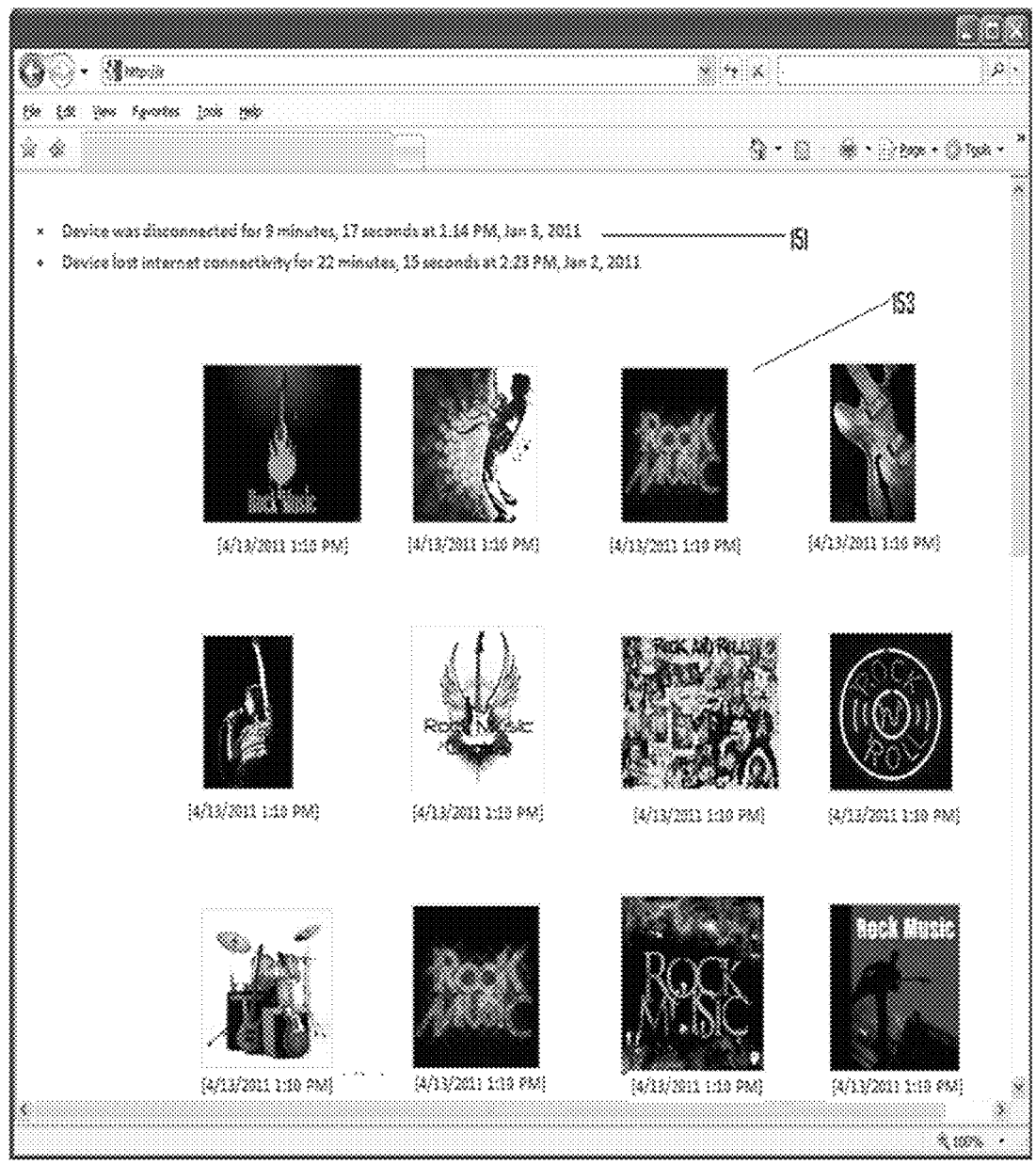
FIG. 6 is a schematic illustration of an exemplary graphical user interface that displays the data collected by the network monitoring appliance of FIG. 1.

In an exemplary embodiment as shown in FIG. 6, the authorized user will be alerted in display field 151 with information regarding instances of network disconnections for the device 3 (as reported by the Internet Connection Monitoring services and the LAN connection monitoring services of the device 3). Such information can include the time the instance of network disconnection occurred and its duration. Similar to a Google image search, the authorized user is also presented in display field 153 with a collage of thumbnails for the collected media requests. The user can click on a respective thumbnail (or possibly mouse over the respective thumbnail or possibly click on an associated link or other perform other suitable user input) to view when the request was made (and possibly information about the requesting computer, if available). In addition, it is contemplated that the interface presented to the authorized user can include controls that allow the user to organize the collected media thumbnails by date, by source computer host name or address, or media type. It can also show only the content that was added to the database since the last visit to the database. It is also contemplated that other views can be presented to the authorized user, such as a list view of the collected media requests. It is also contemplated that the authorized user can be presented with additional options, such as to disable monitoring as performed by the device 3, suspend the monitoring as performed by the device 3, delete any set of media or connection log history, or set other configuration parameters (such as LAN IP address, login name, login password, etc.) of the device 3. It is also contemplated that the collected media requests (and/or the corresponding media itself and/or associated thumbnails as maintained in the Monitoring Results database can be categorized based upon a classification database. The classification database can be derived from human review of the media content and/or by automatic means (such as by classification of text associated with media, by skin tone analysis of the image or video frames, by heuristic analysis of the image or video frames, and/or by contextual analysis of the media). It is also contemplated that notifications (such as email or text notifications) to the authorized user(s) can be automatically communicated in response to the occurrence of certain events as stored in the Monitoring Results database. Such events can include the physical disconnection of the device from the network, absence of Internet connectivity of the device, and/or the collection of a media request that is categorized as belonging to a certain class that is configured to generate alert messages to the authorized user(s) (such as the collection of a media request that is categorized as belonging to Pornography where Pornography media requests are configured to generate alert messages to the authorized user(s)).

Advantageously, the monitoring device 3 dynamically compiles and stores information in the Monitoring Results Database locally (and possibly in a remote Internet based system 13) for certain multimedia content types that are requested by all of the networked devices (e.g., 13A, 13B, 13C) on the LAN and carried in data packets destined for the Internet and forwarded between the gateway router and the broadband modem. It also detects its own physical disconnections and connections to the network over time as well as the status of connectivity to the Internet over time and stores such results in the Monitoring Results Database. This collected information is accessed by authorized users and allows for effective monitoring of the multimedia content that is being requested from the Internet by all of the networked devices on the LAN together with logging that ensures that unauthorized users are not disconnecting the monitoring device 3 from the network and thwart the monitoring function of the monitoring device 3. Moreover, because the monitoring device is separate from the monitored devices and operates on the packet streams of standardized formats, it can be used to effectively monitor the web requests from a large number of devices irrespective of the operating systems and processing platforms of the monitoring devices. Thus, it can be used to monitor network requests from a wide range of networked computer systems (such as Windows PCs, Macs, Unix-based systems) and networked mobile devices (such as mobile phones, ipods, tablets, etc.) without the need to develop and support monitoring functions on a number of different software and processing platforms.

Figure 7:
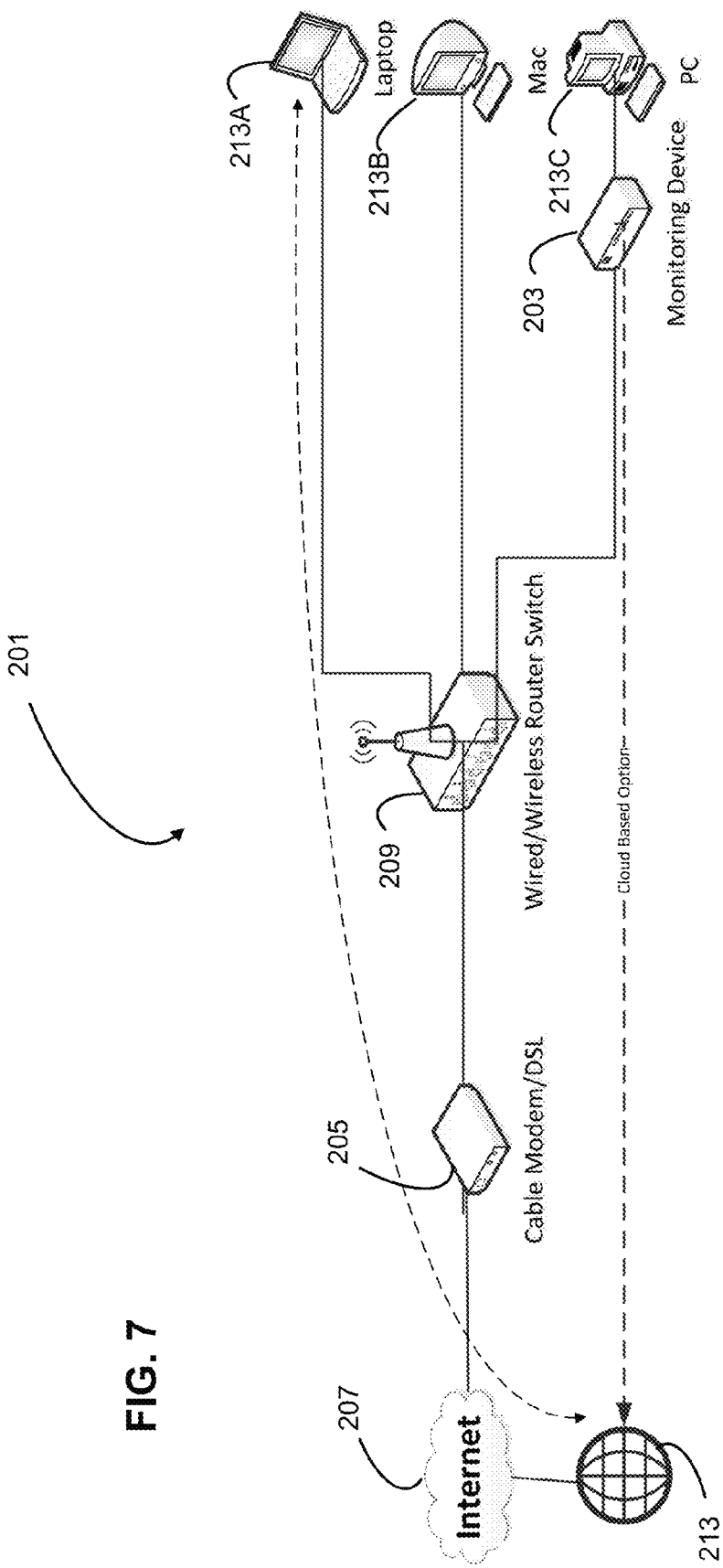
FIG. 7 is a system diagram of a network where the network monitoring appliance is connected between a single networked device on the LAN and a gateway router.

FIG. 7 shows an alternate embodiment of the present application where the functionality of the monitoring device 3 as described above is implemented in a monitoring device 203 that is connected between a single networked device on the LAN (e.g., PC 213C as shown) and the gateway router 9. In this embodiment, the monitoring device 203 dynamically compiles and stores information in the Monitoring Results Database locally (and possibly in a remote Internet based system 213) for certain multimedia content types that are requested by the single networked device (e.g., 213C) on the LAN and carried by data packets destined for the Internet (these data packets are ultimately forwarded by the gateway router 209 to the broadband modem 205 for communication over the Internet). It also detects its own disconnections and connections to the network and Internet and stores such results in the Monitoring Results Database. This collected information is accessed by authorized users and allows for effective monitoring of the multimedia content that is being requested from the Internet by the single networked device on the LAN together with logging that ensures that unauthorized users are not disconnecting the monitoring device 203 from the network and thwart the monitoring function of the monitoring device 203. In this embodiment, the monitoring device 203 is assigned an IP address that falls within the subnet of the LAN. The IP address of the monitoring device 3 can be static in nature and fixed by user. Alternatively, it can be set by DHCP services of the gateway router 9 as is well known. The IP address of the monitoring device 3 can be used by the gateway router 9 as well as the local networked devices (11A, 11B, 11C) of the local area network as the destination address for communicating data packets to the monitoring device 3. NAT Routing of the gateway router 9 can be used to provide for communication between the monitoring device 203 and Internet-based host systems (or other remote computer systems) for communicating data packets therebetween. In this embodiment, some of the applications 126 as described above are not needed and thus can be disabled (or possibly omitted from the monitoring device 203). Such unnecessary applications include the Public and Private IP DHCP Services; instead, the monitoring device 203 can employ convention DHCP client services to set the IP address of the device 203. The unnecessary applications also includes the Packet Routing with Nat services; instead, the monitoring device 203 can function as a transparent bridging node in forwarding data packets between the networked device 213C and the gateway router 209.

Figure 8:
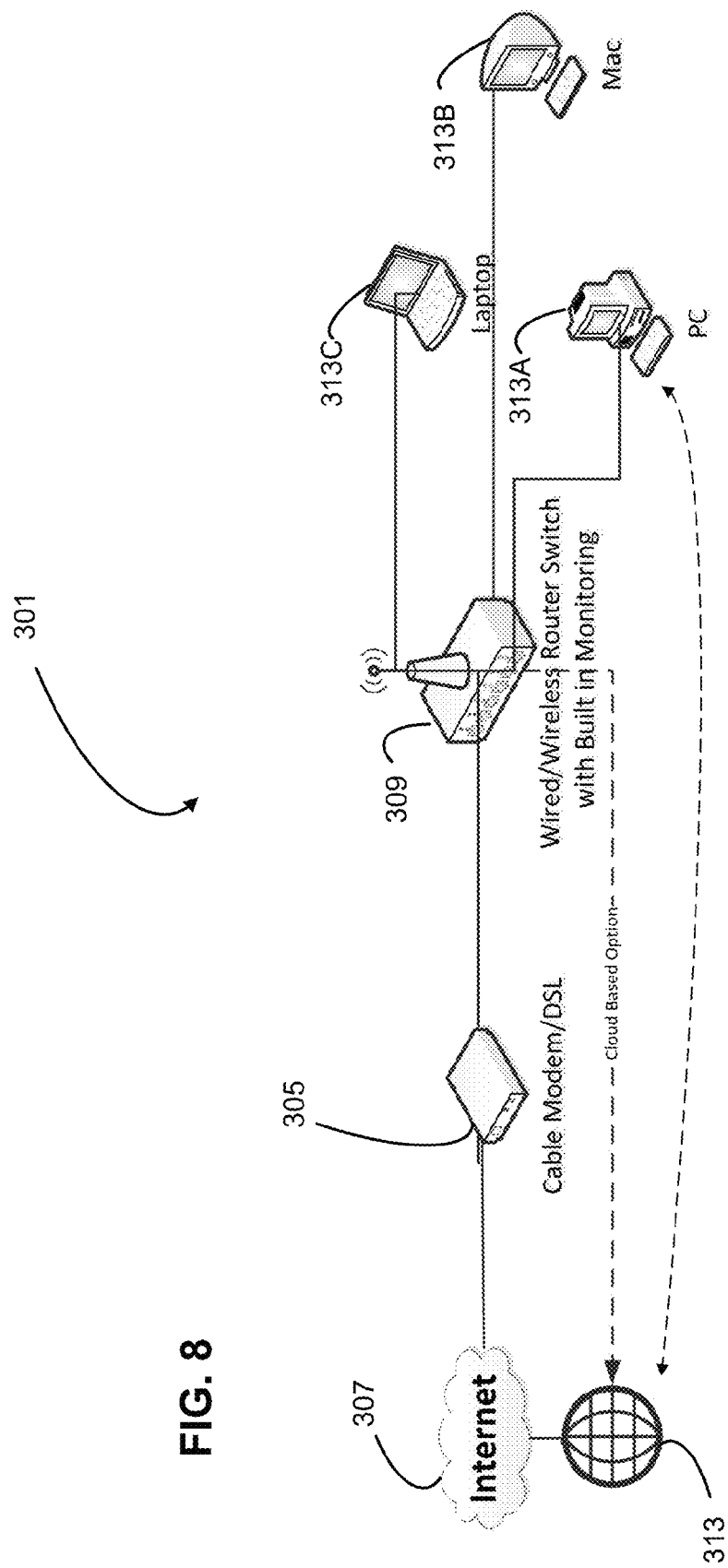
FIG. 8 is a system diagram of a network where network monitoring functionality is implemented as part of a gateway router.

FIG. 8 shows yet another alternate embodiment of the present application where the functionality of the monitoring device 3 as described above is implemented as part of a gateway router 309. In this embodiment, the gateway router 309 dynamically compiles and stores information in the Monitoring Results Database locally (and possibly in a remote Internet based system 313) for certain multimedia content types that are requested by all of the networked devices on the LAN and carried in data packets destined for the Internet and forwarded between the gateway router 309 and the broadband modem 305. It also detects its own disconnections and connections to the network and Internet and stores such results in the Monitoring Results Database. This collected information is accessed by authorized users (such as from a web interface hosted on the gateway router 309) and allows for effective monitoring of the multimedia content that is being requested from the Internet by all of the networked devices (313A, 313B, 313C) on the LAN together with logging that ensures that unauthorized users are not disconnecting the gateway router 309 from the network and thwart the monitoring function of the gateway router 309. In this embodiment, the functions of the Image Monitoring Services, the Internet Connection Monitoring services, the LAN Connection Monitoring services, and the Monitoring Results Database (with optional remote host server upload) as described above is incorporated into the processing platform of the gateway router 309.

The processing platform of the gateway router 309 can include additional services, such as DNS proxy server services, firewall services, routing with network address translation, port forwarding services, DHCP server services for dynamically assigning IP addresses to the networked devices of the local area network, local area network configuration (such as wireless network security settings and other operational parameters), VPN services (e.g., for establishing SSL VPS connections and/or IPSEC VPN connections with the local area network), VPN pass thru functionality, Dynamic DNS services, content filtering of DNS requests, blocking certain types of network traffic (such as email, chat, web browsing) for certain time periods and/or certain computers), TOR packet filtering, and other parental/business control services.

There have been described and illustrated herein several embodiments of a network appliance for monitoring network requests for multimedia content. While particular embodiments of the invention have been described, it is not intended that the invention be limited thereto, as it is intended that the invention be as broad in scope as the art will allow and that the specification be read likewise. Thus, while particular Ethernet and TCP/IP packet processing architectures and operations have been disclosed, it will be appreciated that other suitable Ethernet and TCP/IP packet processing architectures and operations can be used as well. For example, parts of the Ethernet and TCP/IP packet processing operations can be implemented in specialized hardware mechanisms for increased throughput. Moreover, while particular configurations have been disclosed in reference to a graphical user interface that allows for access to the stored information pertaining to the collected network requests, it will be appreciated that other graphical user interfaces could be used as well. Moreover, while particular mechanisms for detecting physical network connectivity of the monitoring device as well as Internet connectivity of the monitoring device have been disclosed, it will be appreciated that other suitable connectivity monitoring mechanisms can be used as well. In addition, while particular local area network architectures have been disclosed, it will be appreciated that the networking appliance of the present application can be integrated into a wide variety of other local area network architectures. For example, the broadband modem can be replaced by other suitable units that provide for Internet access. For homes and small businesses, the Internet access unit can employ a number of standardized communication technologies, such as dial-up, Integrated Services Digital Network (ISDN), DSL (typically Asymmetric Digital Subscriber Line), broadband wireless (such as IEEE 802.16, and IEEE 802.20) DOCSIS for cable modems, and fiber to the home (FTTH) technologies (such as 2.5 GPON—ITU G.984, 1 GE P2P Ethernet—IEEE 802.3ah, 1 GE EPON—IEEE 802.ah, 10G GPON—ITU G.987, 10G EPON (XEPON)—IEEE 802.3av). For customers with more demanding requirements, such as medium-to-large businesses, the Internet access unit can employ a number of standardized communication technologies, such as Ethernet, Metropolythian Ethernet, Gigabit Ethernet, Frame Relay, ISDN (B.R.I. or P.R.I.), and ATM (Asynchronous Transfer Mode), and SONET. It is also contemplated that the gateway router can provide for Internet access (without the use of a separate Internet access unit). In this case, the gateway router can employ a number of standardized communication technologies, such as dial-up, Integrated Services Digital Network (ISDN), DSL (typically Asymmetric Digital Subscriber Line), broadband wireless (such as IEEE 802.16, and IEEE 802.20) DOCSIS for cable modems, fiber to the home (FTTH) technologies (such as 2.5 GPON—ITU G.984, 1 GE P2P Ethernet—IEEE 802.3ah, 1 GE EPON—IEEE 802.ah, 10G GPON—ITU G.987, 10G EPON (XEPON)— IEEE 802.3av). Ethernet, Metropolythian Ethernet, Gigabit Ethernet, Frame Relay, ISDN (B.R.I. or P.R.I.), and ATM (Asynchronous Transfer Mode), and SONET. Moreover, the monitoring device can be placed in other parts of a local area network in order to monitor the network requests communicated over the local area network. Moreover, it is contemplated that one or more network devices (e.g., switches, routers, firewall appliances, intrusion detection appliances, and other network monitoring devices) can be deployed between the monitoring device and the Internet. It will therefore be appreciated by those skilled in the art that yet other modifications could be made to the provided invention without deviating from its spirit and scope as claimed.

What is claimed is:

1. A network appliance for monitoring content requested by at least one networked device operably coupled to a local area network and the Internet, the network appliance comprising:
  a local database stored on the network appliance;
  at least one interface for receiving and processing packetized data, the packetized data including packetized data that encapsulates TCP/IP packet data generated by the at least one network device and communicated over the local area network;
  processing means that processes the TCP/IP packet data to identify whether it specifies a URL representing at least one particular file type of multimedia content, and if so, adds the specified URL and an associated date and time to the local database;
  routing logic that forwards the TCP/IP packet data as part of packetized data for downstream data communication to the Internet irrespective of the processing of the TCP/IP packet data that identifies whether the TCP/IP packet data specifies a URL representing at least one particular file type of multimedia content; and
  a first mechanism that monitors physical connections and disconnections of the network appliance to the local area network over time to identify interruptions in local area network connectivity, and that stores in said local database data representing identified interruptions in local area network connectivity of the network appliance; and
  a second mechanism that monitors connectivity of the network appliance to the Internet over time to identify interruptions in Internet connectivity of the network appliance, and that stores in said local database data representing identified interruptions in Internet connectivity of the network appliance.

2. The network appliance according to claim 1, wherein:
  the processing means includes a first processing means and a second processing means,
  wherein the first processing means processes the TCP/IP packet data to identify whether it matches at least one predetermined profile and, if so, adds a particular object corresponding to the TCP/IP packet data to a queue of objects, wherein each object in the queue of objects includes data representing a URL specified by the TCP/IP packet data, a date, and a time; and
  wherein the second processing means processes the queue of objects to automatically determine whether the URL represented by a given object represents at least one particular file type of multimedia content, and if so, adds the URL, date and time represented by the given object to the local database.

3. The network appliance according to claim 2, wherein:
  the predetermined profile corresponds to common methods for accessing multimedia content on the Web.

4. The network appliance according to claim 3, wherein:
  the common methods specify a URL and involve predetermined transport protocols and predetermined network ports.

5. The network appliance according to claim 1, further comprising:
  web server logic, integral to the network appliance, that is configured to provide access to information stored in the local database to at least one authorized user in order to allow the at least one authorized user to review the multimedia content corresponding to URLs specified by TCP/IP data communicated over the local area network.

6. The network appliance according to claim 1, further comprising:
  means for uploading information stored in the local database to a remote computer system.

7. The network appliance according to claim 1, wherein:
  the routing logic employs network address translation on the TCP/IP packet data before encapsulating the TCP/IP packet data for downstream communication.

8. The network appliance according to claim 1, further comprising:
  a first interface that provides for data communication between the network appliance and a single networked device; and
  a second interface that provides for data communication between the network appliance and a gateway router.

9. The network appliance according to claim 1, further comprising:
   a first interface that provides for data communication between the network appliance and a gateway router; and
   a second interface that provides for data communication between the network appliance and an Internet access unit.

10. The network appliance according to claim 1, wherein: the network appliance is a gateway router that provides for monitoring content requested by a plurality of networked computers operably coupled to the gateway router in addition to other router functions.

11. The network appliance according to claim 1, wherein: the at least one particular file type of multimedia content includes at least one of common image file types, common video file types, and common streaming media file types.

12. The network appliance according to claim 1, wherein: the local database stores thumbnail images for media content referenced in the local database; and
   the network appliance further includes web server logic, integral to the network appliance, that is configured to provide access to said thumbnail images stored in the local database to at least one authorized user in order to allow the at least one authorized user to review said thumbnail images.

13. The network appliance according to claim 1, wherein: the local database stores a copy of the media content referenced in the local database; and
   the network appliance further includes web server logic, integral to the network appliance, that is configured to provide access to the copy of said media content stored in the local database to at least one authorized user in order to allow the at least one authorized user to review the copy of said media content.

14. A system which monitors content requested by at least one networked device operably coupled to a local area network and the Internet, the system comprising:
   a network appliance and remote server operably coupled to one another over the Internet;
   wherein the network appliance includes
      a local database stored on the network appliance;
      at least one interface for receiving and processing packetized data, the packetized data including packetized data that encapsulates TCP/IP packet data generated by the at least one network device and communicated over the local area network;
      processing means that processes the TCP/IP packet data to identify whether it specifies a URL representing at least one particular file type of multimedia content, and if so, adds the specified URL and an associated date and time to the local database;
      routing logic that forwards the TCP/IP packet data as part of packetized data for downstream data communication to the Internet irrespective of the processing of the TCP/IP packet data that identifies whether the TCP/IP packet data specifies a URL representing at least one particular file type of multimedia content;
      a first mechanism that monitors physical connections and disconnections of the network appliance to the local area network over time to identify interruptions in local area network connectivity, and that stores in said local database data representing identified interruptions in local area network connectivity of the network appliance; and
      a second mechanism that monitors connectivity of the network appliance to the Internet over time to identify interruptions in Internet connectivity of the network appliance, and that stores in said local database data representing identified interruptions in Internet connectivity of the network appliance; and
      upload logic that cooperates with the remote server to upload data stored in the local database to the remote server; and
   wherein the remote server is configured to provide access data stored by the remote server in order to allow at least one authorized user to review the multimedia content corresponding to URLs specified by TCP/IP data communicated over the local area network of the network appliance.

15. The system according to claim 14, wherein: the routing logic of the network appliance employs network address translation on the TCP/IP packet data before encapsulating the TCP/IP packet data for downstream communication.

16. The system according to claim 14, wherein: the network appliance further includes a first interface and a second interface;
   wherein the first interface provides for data communication between the network appliance and a single networked device; and
      wherein the second interface provides for data communication between the network appliance and a gateway router.

17. The system according to claim 14, wherein: the network appliance further includes a first interface and a second interface;
   wherein the first interface provides for data communication between the network appliance and a gateway router; and
   wherein the second interface provides for data communication between the network appliance and an Internet access unit.

18. The system according to claim 14, wherein: the network appliance is a gateway router that provides for monitoring content requested by a plurality of networked computers operably coupled to the gateway router in addition to other router functions.

19. The system according to claim 14, wherein: the at least one particular file type of multimedia content includes at least one of common image file types, common video file types, and common streaming media file types.

20. The system according to claim 14, wherein: said upload logic operates automatically at predetermined time intervals to upload data stored in the local database to the remote server.

* * * * *